United States Patent [19]

Shimada et al.

[11] Patent Number: 4,811,244

[45] Date of Patent: Mar. 7, 1989

[54] DRAWING INFORMATION MANAGEMENT SYSTEM

[75] Inventors: Shigeru Shimada, Kodaira; Akimitsu Kondoh, Tokyo; Atsuo Miyazaki, Yokosuka, all of Japan

[73] Assignee: Hitachi, Ltd., Tokyo, Japan

[21] Appl. No.: 101,020

[22] Filed: Sep. 25, 1987

[30] Foreign Application Priority Data

Sep. 26, 1986 [JP] Japan .............................. 61-225938
Dec. 2, 1986 [JP] Japan .............................. 61-285971

[51] Int. Cl.$^4$ ................................................ G06F 3/03
[52] U.S. Cl. ....................................... 364/521; 340/720
[58] Field of Search ............... 364/521, 522, 518, 488, 364/480; 340/720, 723, 732, 734, 721, 722, 731; 358/104

[56] References Cited

U.S. PATENT DOCUMENTS

| | | | |
|---|---|---|---|
| 4,295,135 | 10/1981 | Sukonick | 340/721 X |
| 4,365,305 | 12/1982 | MacDonald et al. | 364/521 |
| 4,486,835 | 12/1984 | Bai et al. | 364/480 X |
| 4,578,766 | 3/1986 | Caddy | 364/521 |
| 4,715,005 | 12/1987 | Heartz | 364/521 |
| 4,754,408 | 6/1988 | Carpenter et al. | 364/488 X |

Primary Examiner—M. H. Paschall
Assistant Examiner—A. Jonathan Wysocki
Attorney, Agent, or Firm—Antonelli, Terry & Wands

[57] ABSTRACT

A domain covering a drawing data subjected to information processing is determined and equally divided into meshes of predetermined smallest size. For each of vectors constituting a drawing data subjected to the processing, the number of the meshes traversed by the vector is counted. When the number of the meshes traversed by a given one of the vectors exceeds a predetermined value, the domain is equally divided into meshes of a larger mesh size and the number of the updated meshes traversed by the given one vector is counted. By repeating this operation, all the vectors are stored in a memory as the drawing information in terms of the mesh size and the coordinates of the meshes traversed by vector. Since the number of the meshes traversed by the vector thus can not exceed the predetermined value, the speeding-up of the drawing information processing can be accomplished. A predetermined value may be provided for the mesh size, if desired. When the mesh size for a given vector exceeds this predetermined value, the coordinates of a rectangle circumscribing the given vector may be stored in the memory as the drawing information.

15 Claims, 10 Drawing Sheets (1/64 MESH)

SEGMENTS
①: 100101
②: 100201
③: 100301
④: 100401

(1/16 MESH)

(1/4 MESH)

FIG. 2
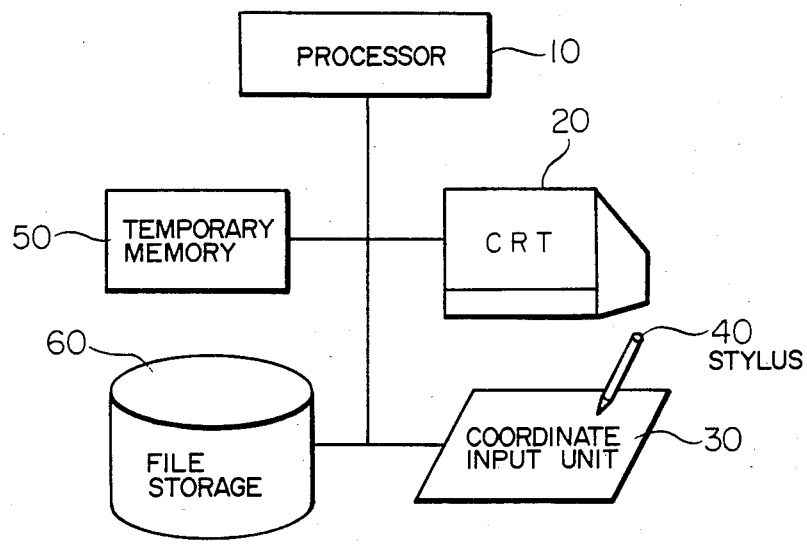
FIG. 3
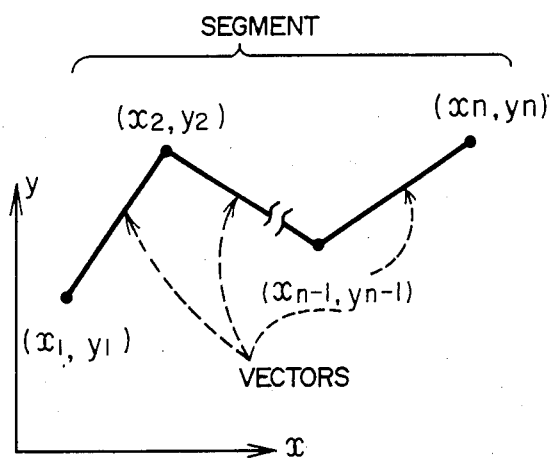
FIG. 4
| NUMBER OF COMPONENTS | $n$ |
| SEGMENT NUMBER | $\ell_{no}$ |
| SEGMENT TYPE | $\ell_k$ |
| COORDINATE DATA | $x_1$ |
| | $y_1$ |
| | $x_2$ |
| | $y_2$ |
| | $\vdots$ |
| | $\vdots$ |
| | $x_n$ |
| | $y_n$ |

FIG. 5
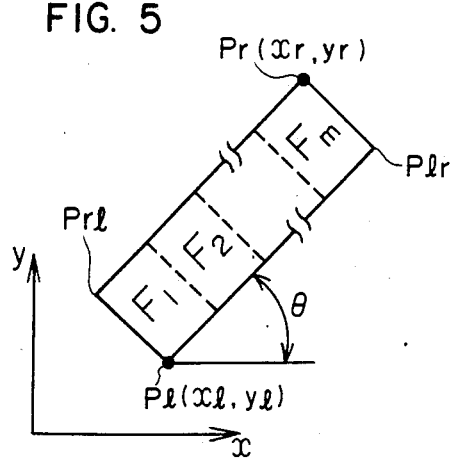
FIG. 6
| NUMBER OF CHARACTERS | m |
| REFERENCE NO. OF TEXT | tno |
| TEXT TYPE | tk |
| INCLINATION OF TEXT | θ |
| DIAGONAL COORDINATES OF TEXT CIRCUM-SCRIBING RECTANGLE | $x_r$ |
| | $y_r$ |
| | $x_l$ |
| | $y_l$ |
| TEXT DATA | $f_1$ |
| | $f_2$ |
| | ⋮ |
| | $f_m$ |
FIG. 7
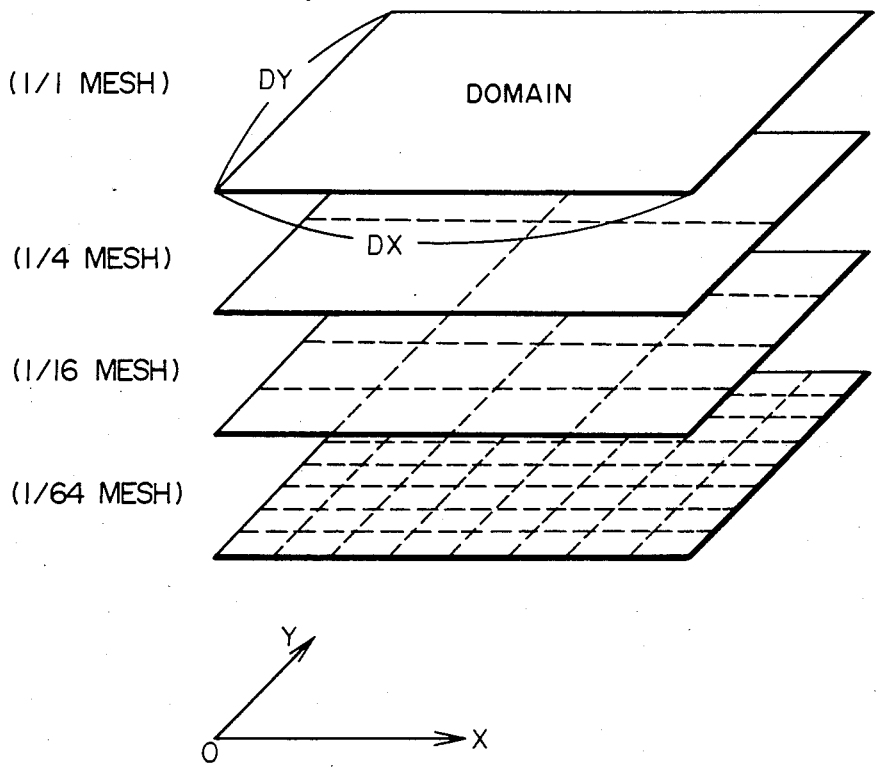

| VECTOR MANAGE NO. | CLASSIFI-CATION | MESH SIZE | MESH ID NO. |
|---|---|---|---|
| 100101 | V | 1/64 | (7, 3) |
| 100201 | " | " | (6, 3) |
| " | " | " | (6, 4) |
| " | " | " | (7, 4) |
| 100301 | " | 1/16 | (2, 2) |
| " | " | " | (3, 2) |
| " | " | " | (3, 3) |
| " | " | " | (4, 3) |
| 100401 | " | 1/4 | (1, 1) |
| " | " | " | (1, 2) |
| " | " | " | (2, 2) |

| TEXT/SYMB. MANAGE NO. | CLASSIFICATION | MESH SIZE | MESH ID NO. |
|---|---|---|---|
| 1001 | C | 1/64 | (2,2) |
| " | " | " | (3,2) |
| " | " | " | (4,2) |
| " | " | " | (2,3) |
| " | " | " | (3,3) |
| " | " | " | (4,3) |
| " | " | " | (5,3) |
| " | " | " | (6,3) |
| " | " | " | (7,3) |

FIG. 15
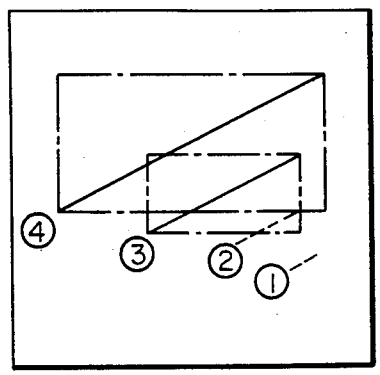
FIG. 17
| VECTOR MANAGE NO. | TYPE | Xmin | Ymin | Xmax | Ymax |
|---|---|---|---|---|---|
| 100301 | V | x3 min | y3 min | x3 max | y3 max |
| 100401 | V | x4 min | y4 min | x4 max | y4 max |
|  |  |  |  |  |  |
FIG. 18
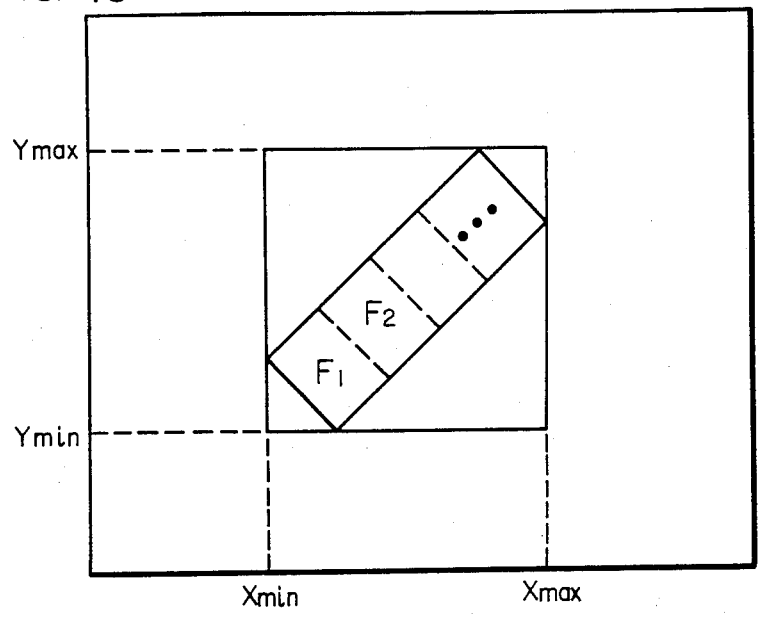

DRAWING INFORMATION MANAGEMENT SYSTEM

BACKGROUND OF THE INVENTION

The present invention relates to a method of performing interactive retrieval and edition of drawing information of various design schematics and maps at a high speed. More particularly, the present invention concerns a high-speed processing procedure suited for drawing of a type which contains components or elements having a magnitude undergoing steep or abrupt variation.

Heretofore, a variety of high-speed processing procedures have been proposed for retrieving at a high speed a drawing including spatial position information concerning two- or more-dimensional objects, such as schematics and maps. By way of example, JP-A No. 62-145369 (hereinafter referred to as a reference (1)) discloses a high-speed processing method for the drawing according to which the multi-dimensional space of a schematic is divided into latices of a predetermined grid constant (hereinafter referred to as meshes), wherein the positions of the meshes traversed by individual picture elements constituting the drawing pattern are stored so that upon retrieval, only a limited number of the picture elements are retrieved to be subjected to the processing from the designated mesh positions, to thereby allow the processing to be speeded up.

In J. L. Bentley's article entitled "Multi-Dimensional Binary Search Trees Used For Associative Searching" appearing in "COMMUN. ACM." 19, 9(1975) (hereinafter referred to as the reference (2)), there is proposed a domain dividing method known as the K-D tree method, according to which a schematic is divided into areas of different sizes (hereinafter referred to as key areas) covering individual elements instead of being divided into meshes through the procedure based on the binary division system, wherein the division into key areas and tree structurization are repeated until the number of the picture elements contained in the individual key areas becomes uniform. This procedure allows the number of the key areas used for limitation of the picture elements in the processing to be reduced.

In general, however, the design schematics as well as maps include the picture elements of which magnitudes vary remarkably. Besides, they are frequently subjected to editing manipulations such as alteration of the picture element position and others. Under the circumstance, when the procedure disclosed in the reference (1) is adopted, the number of the meshes traversed by the picture element having a large size is increased. Accordingly, in case the processing such as displacement of the picture element positions is to be performed at the stage of edition, the volume of processing involved in the alteration of the mesh positions traversed by the picture elements will be significantly increased, presenting a problem. On the other hand, in case the procedure disclosed in the reference (2) is applied, there are required a series of processings which includes determination of the position within the key area to which picture elements have been displaced through the editing procedure and verification of the predetermined positions by tracing the structural tree in the key areas for modifying the tree structure. However, these processings are in general of a complicated nature. Besides, the modification is inevitably accompanied with remarkable degradation in performance of the K-D tree and is rendered actually impractical, thus giving rise to a problem.

SUMMARY OF THE INVENTION

It is therefore an object of the present invention to solve the problems pointed out above and provide a drawing information management method and system for allowing the data to be processed at a high speed by preventing the number of meshes involved in the processing from becoming excessively large even when the picture elements undergo the processing such as retrieval/edition are of great size.

To accomplish the above object, there is provided according to an aspect of the present invention a high-speed drawing information managing method which is based on the storage of positions of the meshes covered or traversed by the picture element and in which the size of the mesh is changed in dependence on the size of the picture element so that the number of meshes traversed by any given picture element subjected to the processing may not exceed a predetermined value. In a high-speed managing method according to another aspect of the present invention, data of a region circumscribing a picture element is stored as the drawing information when that picture element is of such a size as to exceed a predetermined upper limit of the mesh size.

According to the drawing information management method of the invention, those picture elements to be processed which are of small size can be managed through the hitherto known mesh management procedure to facilitate limitation of the candidates for the processing, while the picture elements of large size are managed with the meshes appropriate to the element sizes being processed, whereby the number of candidates for the processing can be prevented from increasing unnecessarily. Furthermore, since a picture element of even greater size can be managed with the circumscribed rectangle which bears a one-to-one correspondence to such picture element, modification or alteration of the management information by the retrieval/edition can be realized very easily.

BRIEF DESCRIPTION OF THE DRAWINGS

FIG. 2 is a view showing schematically a general arrangement of a drawing data processing/management system to which the present invention can be applied;

FIG. 3 is a view for illustrating elements constituting a picture element of pattern;

FIG. 4 is a view showing a format of picture element data stored internally in a file storage unit;

FIG. 5 is a view for illustrating text/symbol element, by way of example;

FIG. 6 is a view showing a format of text/symbol element data stored internally in the file storage unit;

FIG. 7 is a view showing a procedure for hierarchical structurization of drawing information by the size of adaptive meshes;

FIG. 14 is a view for illustrating in a flow chart a retrieval algorithm in which the adaptive meshes are made use of;

FIG. 15 is a view illustrating definition of circumscribed rectangles for vectors of magnitudes greater than a predetermined value;

FIG. 17 is a view showing an example of circumscribed region management table for vectors of magnitudes greater than predetermined value; and FIG. 18 is a view for illustrating a method of determining indexes of the text/symbol element to be registered in the table shown in FIG. 17.

DESCRIPTION OF THE PREFERRED EMBODIMENTS

Figure 1A:
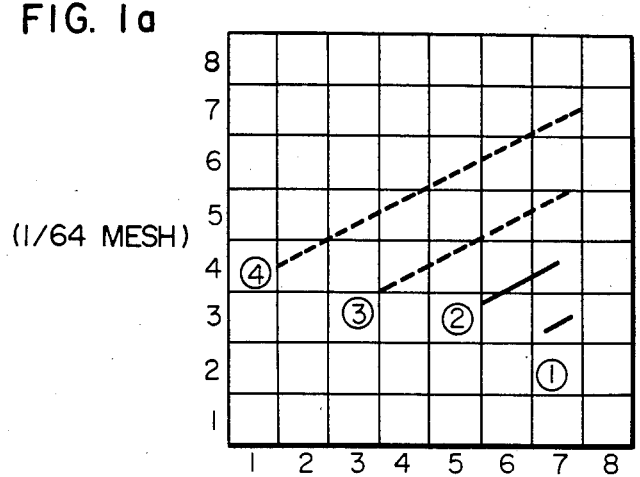
FIG. 1a, 1b and 1c are views for illustrating procedures for preparing adaptive meshes used in the drawing information management according to the invention.

In the following, an exemplary embodiment of the drawing information management according to the present invention will be described. FIG. 2 s a block diagram showing, by way of example, an arrangement of a system to which the invention can be applied. In the figure, a reference numeral 10 denotes a processor which may be constituted by a central processing unit or CPU of a microprocessor or minicomputer, a numeral 20 denotes a cathode ray tube or CRT for displaying schematic/map data subjected to the graphic processing such as retrieval and/or edition processing, reference numerals 30 and 40 denote a stylus and a coordinate input device, respectively, a numeral 50 denotes a memory for storing temporarily management data for speeding up the retrieval of schematic/map data to be processed, and a reference numeral 60 denotes a file system such as a magnetic disk system or the like for storing the schematic/map data.

Figures 12, 13:
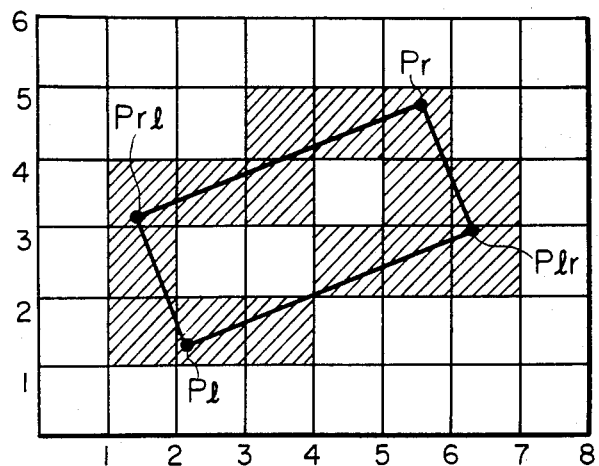
FIG. 12 is a view for illustrating a procedure for determining the identification numbers of meshes which are traversed by text/symbol element.
FIG. 13 is a view showing a table storing the meshes appropriate to given text/symbol element.

In the arrangement described above, consideration will first be given to the data format for the schematic/map data to be stored in the file system 60 on the assumption that picture elements contained in a schematic and/or map under consideration can all be expressed in terms of polygons. In connection with the illustrative embodiment, it should be mentioned that a polygon is regarded as being able to be defined either by a single segment representing the whole polygon continuously, as illustrated in FIG. 12, or by a set of vectors each defined by a pair of coordinates, as illustrated in FIG. 3. The set of vectors illustrated in FIG. 3 is destined to be stored in a picture data table of such a format as illustrated in FIG. 4. In this figure, the segment number lno is a sort of reference number which allows the storage location for the associated segment to be accessed by an intrinsic number instead of a physical address, and the segment type lk is a value identifying discriminatively the species of line such as solid line, broken line, chained line and others as well as color of the line when the segment is to be displayed on the CRT 10. Further, the constituent number n represents the number of vectors which constitutes a segment, and the coordinate data $(x_1, y_1, x_2, y_2, \ldots, x_n, y_n)$ represents the coordinates of a starting point, bending points and an end point of a vector, respectively.

On the other hand, text/symbol elements in the schematic/map are registered in a text/symbol table having a format shown in FIG. 6 and stored in the file system 60 in terms of diagonal left bottom coordinates Pl (xl, yl), diagonal right top coordinates Pr (xr, yr) and an angle $\theta$ of inclination of a circumscribed rectangle, as is illustrated in FIG. 6. The text number tno in the table in FIG. 6 is a reference number for allowing the table to be accessed by the intrinsic number as with the case of the segment number lno in the picture element table (FIG. 4), and the text type tk in the table of FIG. 6 is a value prescribing the text font style such as Ming-style, Gothic-style and others as well as thickness of the stroke. The text data $f_1, f_2, \ldots, f_m$ in the table of FIG. 6 are code data for the individual characters $F_1, F_2, \ldots, F_m$ which are displayed in such a manner as illustrated in FIG. 5.

Next, a method of preparing indexes used in hierarchical data management for speeding up the processing will be described. (These indexes will hereinafter be referred to simply as the adaptive mesh.) According to one method, the adaptive meshes may be previously prepared independent of the data processing such as retrieval and/or edition and stored in the file system 60 shown in FIG. 2 so that they may be transferred to the temporary memory 50 at the same time as the transfer of the drawing data immediately before execution of the data processing. According to another method, the adaptive meshes may be prepared dynamically immediately after the elements to be processed have been transferred to the temporary memory 50 from the file system 60. The procedure adopted in the illustrated embodiment of the invention and described hereinafter is applicable to either of the first or second mentioned method. Although the method of preparing the adaptive mesh differs for the picture elements and for the text/symbol elements, respectively, as described below, the results obtained after the adaptive mesh preparation method was carried out are stored in terms of the same type of mesh data.

In the first place, the adaptive mesh preparation method for the picture elements will be considered. Referring to FIG. 7, the range or domain of a schematic or map (hereinafter referred to simply as domain) which is subjected to the processing is defined as (DX, DY), wherein sides DX and DY are each divided into equal intervals to create a virtual mesh grid. A plurality of mesh grids which differ from one another in respect to the mesh size may be provided and arranged hierarchically with reference to the mesh size. For example, there can be established such a mesh division rule that the sides DX and DY are each divided by a factor of $\frac{1}{2}^n$ to thereby divide the domain into $\frac{1}{2}^{2n}$ meshes, as in the case of the mesh preparation method illustrated in FIG. 7. In that case, the ratios of the adaptive mesh sizes to the whole domain area are hierarchically sequenced as follows:

1/1 (where n=0), 1/4 (where n=1),

1/16 (where n=2), 1/64 (where n=3),

1/256 (where n=4), . . .

Figure 1B:
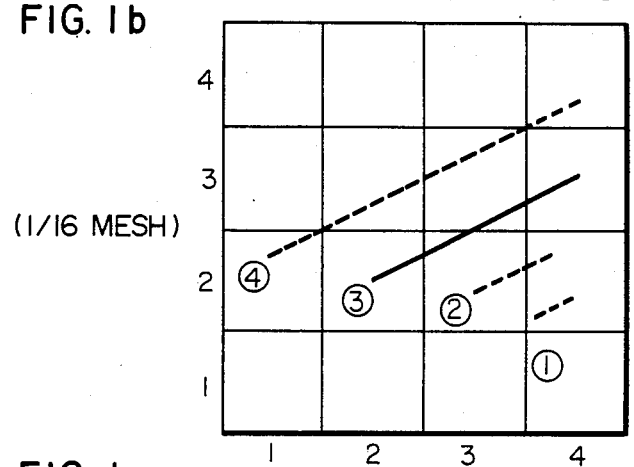
Figure 1C:
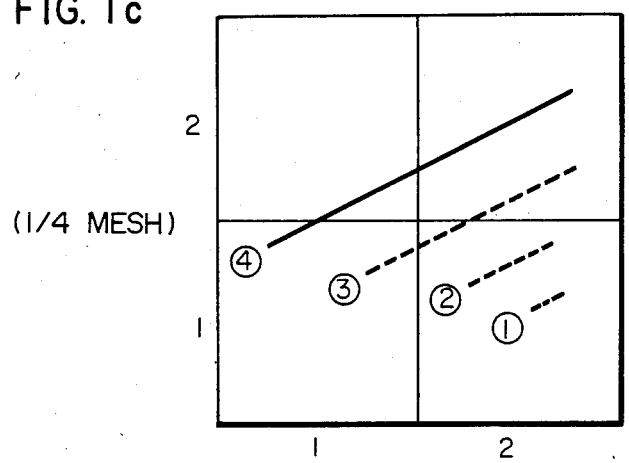
Figures 8, 9:
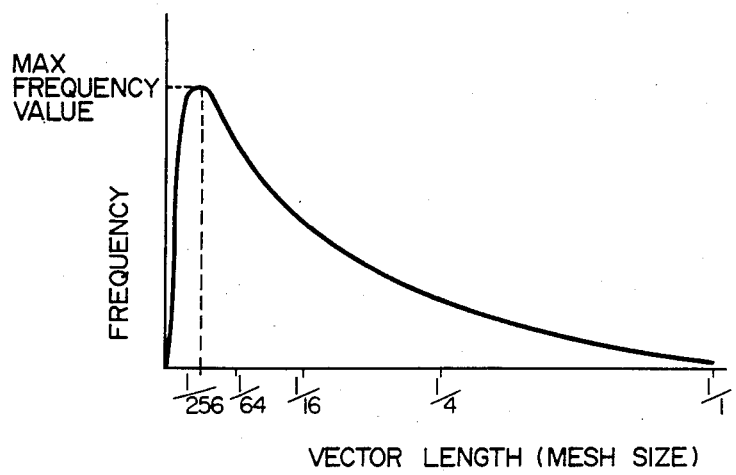
FIG. 8 is a view showing a frequency distribution plotted in terms of vector lengths and frequencies at which the vector lengths make appearance.
FIG. 9 is a view showing a table listing the adaptive meshes in relation to drawing information.

The minimum size of the adaptive mesh is so selected that the frequency distribution illustrated in FIG. 8 can be obtained. In this figure, the length of the vector component of each segment is taken along the abscissa with the frequency at which the vector lengths make appearance being taken along the ordinate. By way of example, the minimal value of the adaptive mesh size may be selected to be closest to the value at which the frequency distribution curve shown in FIG. 8 attains the maximal point. In this conjunction, it will be noted that the minimal mesh size is so selected as to correspond to 1/64 in the case of the illustrated embodiment for simplification of the description. Of course, it is also possible to select as the minimal mesh size the one which is smaller than the mesh size corresponding to the maximal point of the frequency distribution curve but located close to the latter. Next, vectors of each segment are examined to determine those meshes which are traversed by the individual vectors, respectively, the results of which are then stored in a V-M relational table shown in FIG. 9 in which the vectors and the associated meshes traversed by the vectors, respectively, are entered. In this case, the procedure for determining the adaptive mesh identification numbers which identify the meshes traversed by the vectors is executed by selecting the adaptive mesh of the minimal size as the starting point. By way of example, it is assumed that in the case of the virtual mesh series (¼, 1/16, 1/64) shown in FIG. 1, the adaptive meshes appropriate to the vectors (which are assumed to be of independent segments, respectively) ① to ④ are to be determined. This procedure is illustrated in FIGS. 1a, 1b and 1c. The vectors designated by ① and ② are shown in solid lines in FIG. 1a, while the vectors ③ and ④ are shown in solid lines in FIGS. 1b and 1c, respectively A method of determining the adaptive mesh will now be described.

Figure 10:
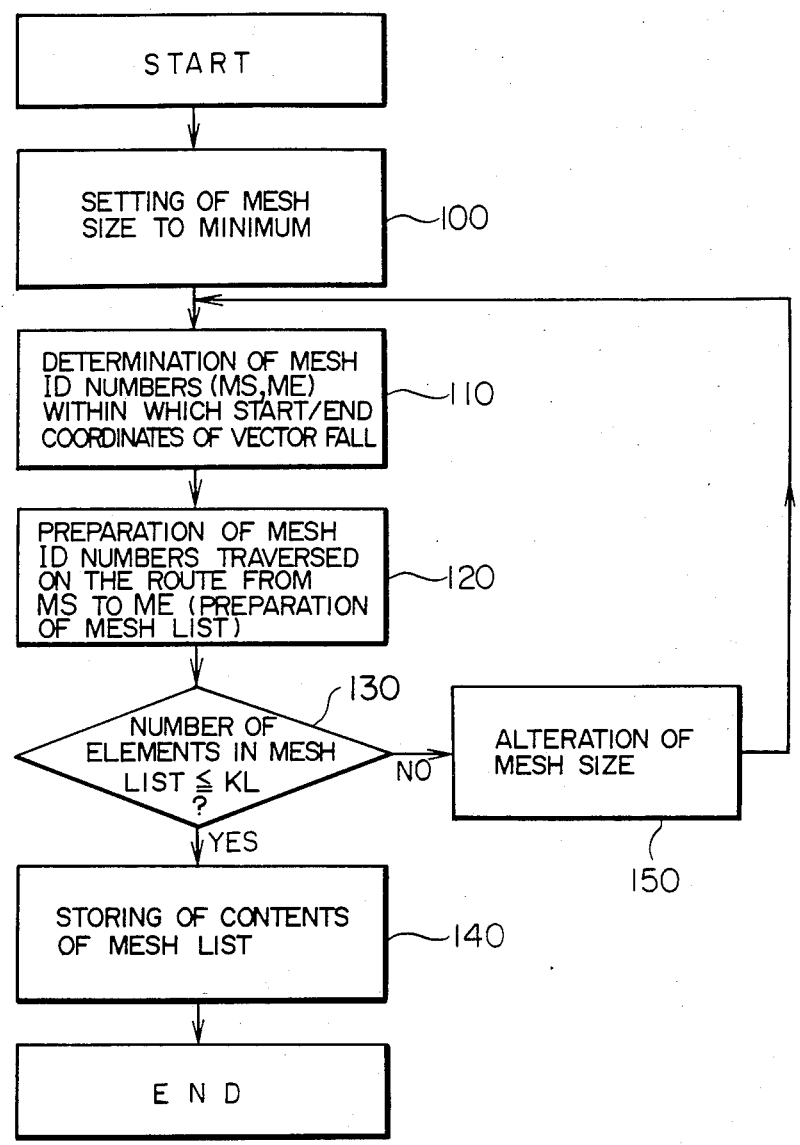
FIG. 10 is a view illustrating in a flow chart an algorithm for preparing meshes appropriate to given drawing information.

FIG. 10 is a view illustrating an algorithm for preparing the adaptive mesh for one vector of picture data.

Referring to FIG. 10, the adaptive mesh grid of the minimal mesh size is selected as the one to be used in the processing at a step 100.

At the next step 110, the meshes of the selected mesh grid are arithmetically determined within which the starting point coordinates ($v_{xs}$, $v_{ys}$) and the end point coordinates ($v_xl$, $v_yl$) of the vector under consideration fall, respectively, being followed by determination of the corresponding mesh identification (ID) numbers which are designated by MS and ME, respectively.

At a step 120, the identification (ID) numbers of those meshes traversed by the vector on the route from the abovementioned start mesh MS to ME are determined to be used in preparation of a list together with the preceding mesh identification numbers MS and ME. This list is referred to as the mesh list of which contents are represented by (MS, MM$_1$, ..., MM$_K$, ME)

The mesh identification number can be determined, for example, by resorting to the Bresenham's algorithm. Concerning the procedure involved in determining the mesh identification number in accordance with this algorithm, reference may be made to Bresenham's "Algorithm For Computer Control Of Digital Plotter" of "IBM System Journal", 4.1, p.p. 25-30 (1965).

At a step 130, the number of elements contained in the mesh list is determined for each vector and decision is made as to whether the number as determined is smaller or larger than a predetermined parameter value KL. Unless the number of these elements exceeds the parameter value KL, the content of the mesh list is stored in the form of a V-M relational table illustrated in FIG. 9 together with the size of the mesh undergone the above processed at a step 140.

On the other hand, when the number of the elements in the mesh list is greater than the parameter value KL, the current mesh grid is replaced by the mesh grid of higher hierarchical level (i.e. the mesh grid of next greater mesh size) at a step 150, and return is made to the step 110.

The procedure starting from the step 110 and ending at the step 140 is executed repeatedly for all vectors.

The value of the parameter KL used in the algorithm step 130 for changing over or altering the mesh size on the basis of the number of meshes which are traversed by the vector can be selected arbitrarily. In the case of the mesh grid of $\frac{1}{2}^{2n}$ divisions illustrated in FIG. 1, the value of the parameter KL may be selected equal to 4, by way of the example. In this conjunction, it is to be noted that the parameter KL set equal to 1 is equivalent to the decision as to whether a given vector is completely included within a single mesh. Further, by managing the V-M relational table shown in FIG. 9 with given one of various relational data base management systems available commercially, retrieval can be effectuated in numerous ways. As the relational data base management system, there can be mentioned a system which is disclosed in E. F. Codd's article entitled "A Relational Model of Data For Large Shared Data Banks" appearing in "Communication Of The ACM", Vol. 13, No. 6 (June 1970). It is however to be noted that in the case of the vector identification number in the V-M relational table shown in FIG. 9, the most significant four positions are allocated to the segment identification number lno with less significant positions being allocated to the number indicative of the intra-segment relative position of vector. Accordingly, when the vector management number shown in FIG. 9 assumes "100101", the first vector is designated by the vector identification number "1001". In this connection, it will be seen from FIGS. 1a to 1c and FIG. 9 that each of the segments "1001" to "1004" is constituted by only one vector. The mesh size and the mesh identification numbers stored in the V-M relational table through the procedure mentioned above are referred to as the adaptive mesh data for each of the segment.

Next, description will be provided for a method of preparing the adaptive mesh data for the text/symbol elements. The basic procedure for this purpose is substantially similar to that for the picture element. In the first place, segments given by $P_l$, $P_{lr}$, $P_r$, $P_{rl}$ which constitute a circumscribed rectangle are determined on the basis of the text inclination $\theta$ and the diagonal coordinates $P_l(x_l, y_l)$ and $P_r(x_r, y_r)$ of the circumscribed rectangle of the text contained in the text/symbol table shown in FIG. 6. The adaptive mesh data for the text/symbol elements include the values assumed by the mesh identification numbers of those meshes which are traversed by the circumscribed rectangle and which are included in that rectangle.

Figure 11:
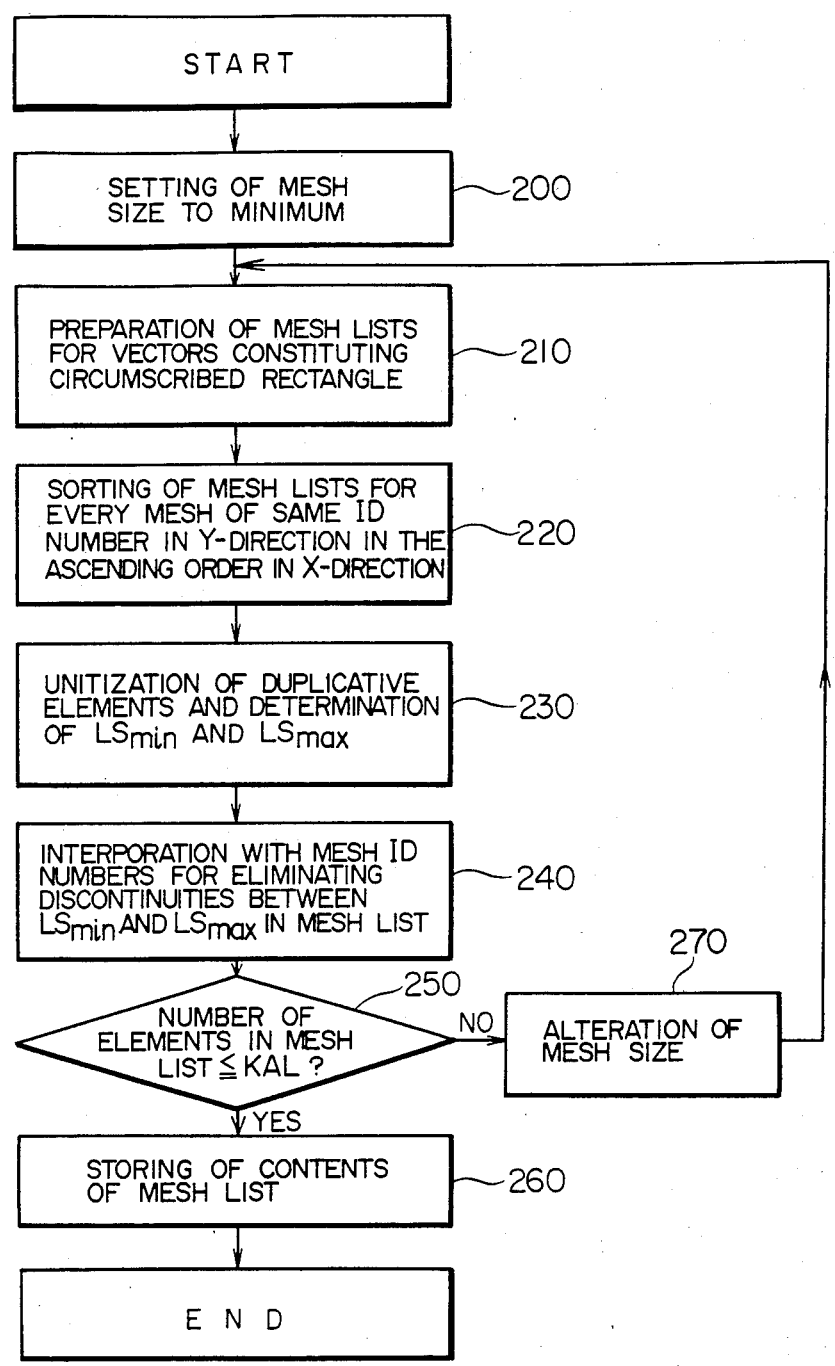
FIG. 11 is a view illustrating in a flow chart an algorithm for preparing the meshes appropriate to given text/symbol element.

Referring to FIG. 11, at a step 200, the mesh size of the minimum value is selected, being followed by the processing in accordance with an adaptive mesh data preparation algorithm for the text/symbol data, which algorithm will be described below.

At a step 210, four vectors of the segments constituting the circumscribed rectangle are considered, wherein a list of meshes traversed by the vectors is prepared in accordance with the Bresenham's algorithm.

At a step 220, the mesh lists for the four vectors are sorted or rearrayed sequentially in the ascending order from the smallest value to the largest value along the X-axis for each of the same mesh identification numbers taken along the Y-axis.

At a step 230, it is checked whether there exist duplicative values in the list of the mesh identification numbers sorted or rearrayed in the X-axis direction. If a the duplication is found, unitization of the duplicative values or numbers is made. Further, the minimum value of the mesh numbers in the X-axis direction is designated b $LS_{min}$ with the maximum value being designated by $LS_{max}$ for each of the lists.

At a step 240, it is checked whether each mesh list contains a discontinuity in the mesh number string between the minimum and maximum mesh numbers $LS_{min}$ and $LS_{max}$. If a discontinuity is found, interpolation is performed with the mesh number selected to cancel out the discontinuity being added to the list.

At a step 250, the numbers of all elements of these mesh lists are added together and a decision is made as to whether the value resulting from the addition is smaller or larger than a parameter KAL. When it is found that the total element number is not greater than the parameter KAL, the size of the mesh being processed as well as the content of the associated mesh list is entered in the V-M relational table similar to the one shown in FIG. 9 at a step 260.

On the other hand, when the number of elements in the mesh lists is greater than the value of the parameter KAL, the mesh grid now being processed is altered to the grid of greater mesh size, and return is made to the step 210.

The stepwise procedure described above is repeated for every vector.

Now, the process including the steps 200 to 260 for preparing the V-M relational table illustrated in FIG. 13 will be described in detail by referring to FIG. 12. The lists of the mesh identification numbers prepared till the step 210 are as follows:

For $\overline{P_lP_{lr}}$, {(3,2) (4,2) (5,3) (6,3) (7,3)}
For $\overline{P_{lr}R_r}$, {(7,3) (7,4) (6,4) (6,5)}
For $\overline{P_rP_{rl}}$, {(6,5) (5,5) (4,5) (4,4) (3,4) (2,4)}
For $\overline{P_{rl}P_l}$, {(2,4) (2,3) (2,2) (3,2)}

After the processing in the step 220, there can be obtained.
Y=2 components {(2,2) (3,2) (4,2)}
Y=3 components {(2,3) (5,3) (6,3) (7,3)}
Y=4 components {(2,4) (3,4) (4,4) (6,4) (7,4)}
Y=5 components {(4,5) (5,5) (6,5)}

The content of the mesh list obtained finally at the step 240 is:

| {(2,2) | (3,2) | (4,2) | (2,3) | (3,3) | (4,3) | (5,3) | (6,3) |
| (7,3) | (2,4) | (3,4) | (4,4) | (5,4) | (6,4) | (7,4) | (4,5) |
| (5,5) | (6,5)} | | | | | | |

The number of the elements in the mesh lists amounts to 18, which is then compared with the parameter KAL. If appropriate, these elements are entered in the V-M relational table.

In the foregoing, the algorithm concerning the method of preparing the adaptive mesh data has been described. Next, description will be provided by the high-speed retrieval algorithm using the adaptive meshes by reference to a flow chart of FIG. 14. In general, in connection with the retrieval, designation by point, designation by line and designation by region (domain) may be considered. However, in the case of the minimum distance retrieval rather than the retrieval based on the perfect matching with the designating elements mentioned above, the retrieval can be reduced to selection of candidates within the designated region. Accordingly, the following description is directed to the retrieval algorithm based on the designation of a rectangular region.

Figure 14:
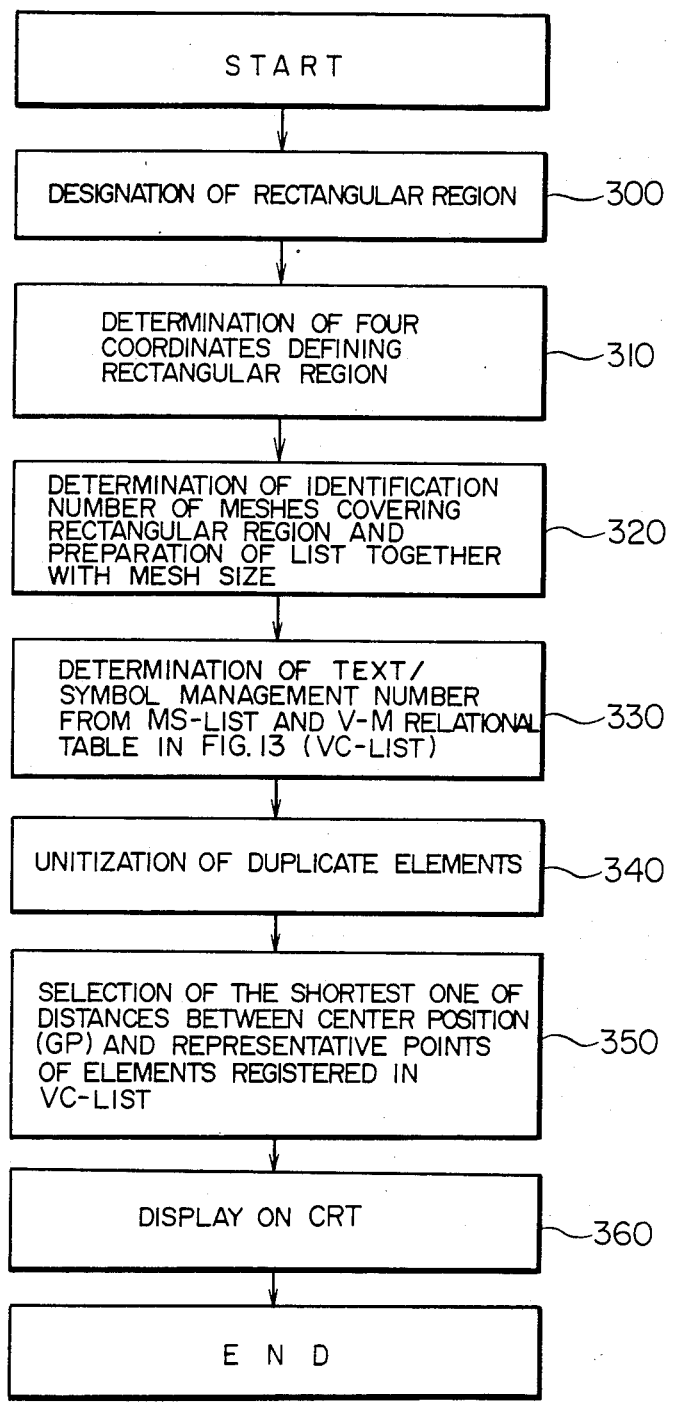

First, at a step 300 in FIG. 14, a rectangular region is designated.

At a step 310, four coordinate positions defining the rectangular region are arithmetically determined.

At a step 320, the identification numbers of those meshes which cover the designated rectangular region are determined on the basis of the four coordinate positions mentioned above. This can be accomplished through the procedure described hereinbefore in conjunction with the steps 210 to 240 in the flow chart of FIG. 11. Each mesh identification number is combined in a pair with the size of the associated mesh being processed to thereby prepare a list termed "MS-List", of which the content is represented by MS-List=(i-th mesh size, mesh number list)

At a step 330, the mesh sizes and the mesh identification umbers of the MS-List are sequentially read out to determine the vector management numbers and the text/symbol numbers at the positions where the mesh sizes and the mesh numbers coincide with those of the V-M relational table shown in FIG. 13, wherein the vector management numbers and the text/symbol number as determined are used to prepare a list termed "VC-List". At a step 340, it is checked to see if any elements exist in duplicate. If the answer of this check step is affirmative, the elements existing in duplicate are unitized.

At a step 350, the center position GP (e.g. centroid) of the designated rectangular region is determined. Subsequently, the distances between the centroid GP of the rectangle and the representative points of the elements registered in the VC-List (e.g. distance between vector and GP, distance between the centroid of the text/symbol circumscribing rectangle and GP, etc . . . ) are checked to select the element corresponding to the shortest distance.

The element thus selected is displayed on the CRT and a decision is made as to whether or not the selected element is appropriate.

As will be appreciated from the foregoing description, there can be prepared according to the first exemplary embodiment of the present invention a constant number n (n<a predetermined value) of mesh lists independent of changes in magnitude for all picture/text/symbol elements, whereby the procedure as well as the processing speed for the retrieval and edition can be significantly reduced to a great advantage.

Next, a second embodiment of the present invention will be described by referring to FIGS. 15 to 18.

In the case of the second embodiment described below, the indexes for hierarchical management are roughly classified into two hierarchies of high and low ranks or levels, respectively. In the following description, it is assumed that the field block disclosed in Suzuki et al's article entitled "Proposal For High-Speed Processing In Large-Scale Schematics Information Management" which appears in "Periodical of Information Processing Society of Japan", Vol. 27, No. 4 (1986), pp. 454–461, is made use of as the index of high level, while the adaptive mesh described above in conjunction with the first exemplary embodiment of the invention is used as the index of low level. However, it goes without saying that the present invention is never restricted to the above assumption. By way of example, the K-D tree disclosed in the reference (2) cited hereinbefore may be used as the typical one of the index of high rank. As another example of the low rank index, there may be mentioned the quadtree disclosed in S. Hanan et al's article "A Geographic Information System Using Quadtrees" appearing in "Pattern Recognition", Vol. 17, No. 6, pp. 647–656, (1984). It should further be mentioned that the method of preparing the indexes can be carried out in the sequence from the high to low rank or level, although the following description is based on the assumption that the index preparation is performed in the ascending order from the low to high rank.

Figure 16:
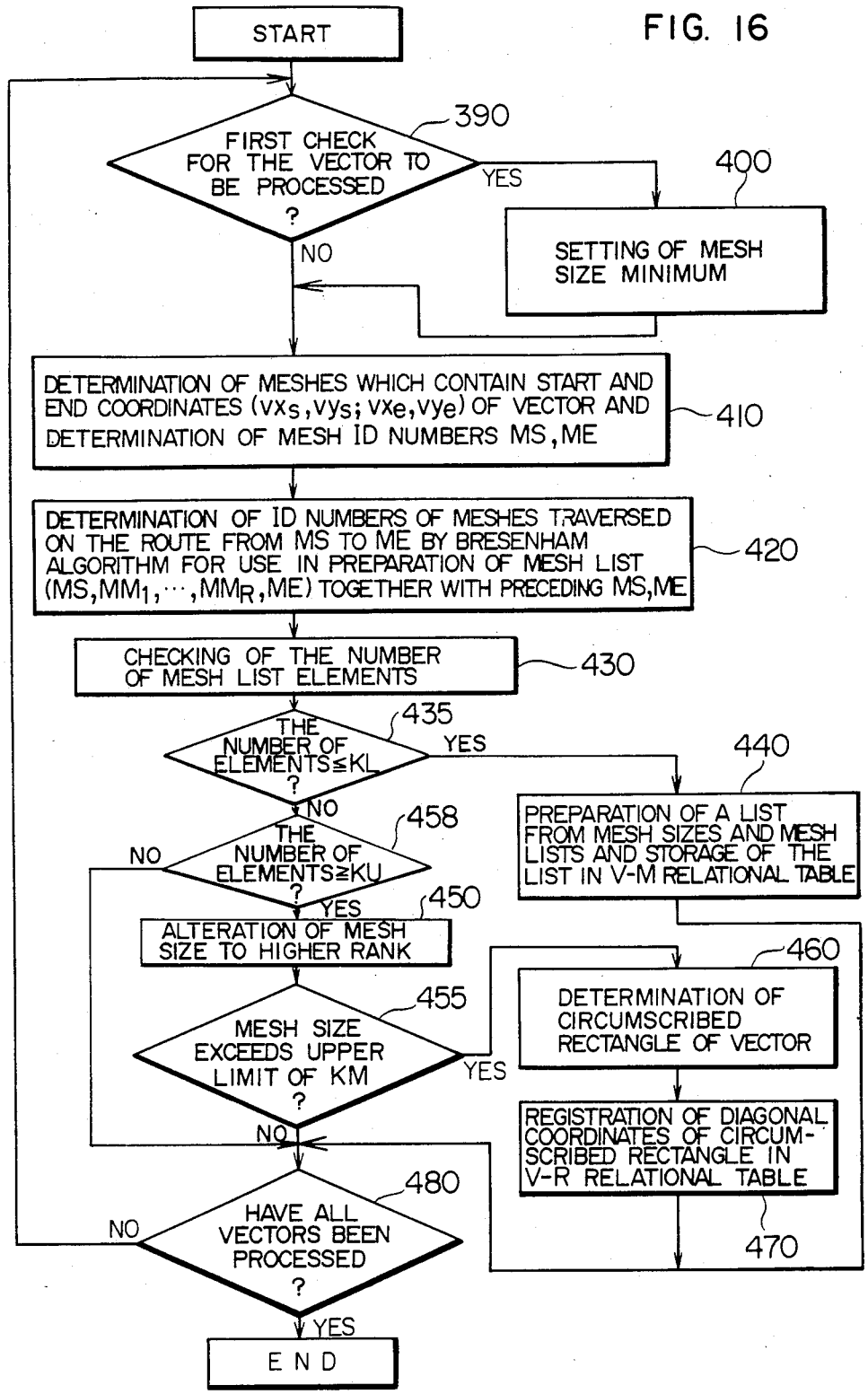
FIG. 16 is a view illustrating in a flow chart for illustrating an algorithm for hierarchical management.

FIG. 16 is a view for illustrating in a flow chart an algorithm for the hierachical management, and FIGS. 17 and 18 are views for illustrating the hierarchical management.

In the first place, description is directed to the algorithm for preparing the indexes of picture elements by referring to FIG. 16. As in the case of the first exemplary embodiment, the range of a schematic or map subjected to the processing (simply referred to as the domain) is represented by sides ($D_x$ and $D_y$), wherein each side $D_x$, $D_y$ is equally divided into a plurality of intervals to thereby prepare a virtual mesh grid. A plurality of such mesh grids of which mesh sizes differ from one another are presumed and classified hierarchically in accordance with the mesh size.

Referring to FIG. 16, decision is made as to whether a vector to be checked for the processing is fresh or not at a step 390. If this decision step results in the affirmative (YES), the procedure proceeds to a step 400 where the mesh grid having the minimum mesh size is selected. On the other hand, when the decision at the step 390 results in the negative (NO), the mesh identification numbers MS and ME of the meshes of the currently used mesh grid to which the start point and the end point of the vector under consideration belong, respectively, are determined to verify which meshes the vector passes (at a step 410). Subsequently, the mesh identification numbers of these meshes which the vector traverses on the route from the mesh MS to the mesh ME, to thereby prepare a mesh list at a step 420, the content of which can be represented as follows:

(MS, MM$_1$, MM$_2$, . . . , ME)

The number of elements contained in this list is then checked at a step 430. If the number in question is not greater than the value of a parameter KL (as decided at a step 435), the mesh size and the mesh list are entered in the V-M relational table of the format shown in FIG. 9 (step 440). On the contrary, when the number of the elements contained in the mesh list has proven to be greater than the parameter KU, the mesh grid of a larger mesh size is again selected (step 450). Further, it is decided at a step 455 whether the mesh size of the newly selected mesh grid exceeds the upper limit value KM. If so, the circumscribed rectangle of the vector is determined (step 460), being followed by a step 470 where the diagonal coordinates of the circumscribed rectangle are registered in the V-R relational table of the format illustrated in FIG. 17. On the other hand, when the mesh size is smaller than the upper limit KM, it is checked at a step 480 whether all the vectors have been processed or not. If the answer is "NO", execution of the procedure following the step 410 is again performed.

In connection with the steps 440 and 450 in the above mentioned algorithm, it should be mentioned that the values of the parameters KU and KL used for changing the mesh grids of different mesh sizes can be given arbitrarily. By way of example, in the case of the mesh grid of $\frac{1}{2}2^n$ divisions shown in FIGS. 1a, 1b and 1c (which illustrate the principle of the hierarchical management according to the present invention), the parameter KU may be selected equal to "5" with KL equal to "4", as illustrated in FIG. 15. In case the parameter KU is set to "2" with KL="1", this is equivalent to the decision as to whether a vector is completely covered by one mesh.

The V-M relational table (FIG. 9) and the V-R relational table (FIG. 17) obtained through the algorithm executing procedure described above correspond to the aforementioned low level index and the high level index, respectively.

The method of preparing the low level index concerning the text/symbol element is the same as that described hereinbefore in connection with the first embodiment of the invention. Accordingly, repeated description of this method will be unnecessary. The high level indexes for the picture element and the text/symbol element are prepared by determining a rectangular region having the sides extending in parallel with the X-axis and Y-axis, respectively, circumscribing a rectangle and registering the diagonal coordinates of the rectangle in the V-R relational table of the format such as illustrated in FIG. 17. Referring to FIG. 5, there is illustrated such a schema that a vector of magnitude smaller than a predetermined value such as those designated by ① and ② in the figure is managed with the adaptive mesh of the low level, while for the vector ③ and ④ having magnitude greater than the predetermined value, a circumscribed rectangle having apexes at the diagonal coordinates of the vector in concern is defined and stored together with the vector identification number.

In the foregoing, the algorithm concerning the method of preparing the hierarchical indexes has been described. However, description concerning the algorithm for high-speed retrieval of the picture element and the text/symbol element with the aid of the hierarchical indexes is omitted because this algorithm may be the same as that described hereinbefore in conjunction with the first exemplary embodiment.

As will now be understood, according to the second embodiment of the present invention, those picture elements subjected to the processing which are of small size are managed through the hitherto known mesh management procedure to facilitate limitation of the candidates for the processing, while the picture elements of large size are managed with the meshes appropriate to the element sizes, whereby the number of candidates for the processing can be prevented from increasing unnecessarily. Furthermore, because the picture element of further greater size is managed with the circumscribed rectangle which bears one-to-one correspondence with the picture element, modification or alteration of the management information by the retrieval/edition can be realized very easily.

We claim:

1. A method of managing drawing information in a drawing information management system including a graphic processor and a storage unit, comprising steps of:
    (a) determining a domain which covers a whole drawing data to be subjected to processing;
    (b) dividing said domain into a first number of meshes of a same size;
    (c) determining the number of the meshes traversed by a vector constituting a part of said drawing data; and
    (d) comparing said number of the meshes with a predetermined value, wherein
        (i) when said number of the meshes is not greater than a predetermined value, the current mesh size and the positions of the meshes traversed by said vector are stored in said storage unit a drawing information of said vector, and a next vector constituting another part of said drawing data is selected to execute the aforementioned steps (b), (c) and (d), while
        (ii) when said number of the meshes exceeds said predetermined value, said domain is divided into a second number of meshes of a same size, which number differs from said first number, being then followed by execution of the aforementioned steps (c) and (d), and
        (iii) when the drawing information have been determined for all the vectors constituting said drawing pattern, storage of said drawing information into said storage unit is completed.

2. A drawing information managing method according to claim 1, wherein at the aforementioned step (d) (ii), said domain is equally divided into the meshes of a mesh size greater than the preceding one.

3. A drawing information managing method according to claim 1, wherein at the aforementioned step (b), said domain is equally divided into the meshes of such a size in which the greatest number of vectors of those constituting said drawing data can be included by the individual meshes.

4. A drawing information managing method according to claim 1, wherein at the aforementioned steps (b) and (d) (ii), said domain is equally divided by a factor of $2^{2n}$ (where n is given one selected from group consisting of 0, 1, 2, 3, ...).

5. A drawing information managing method according to claim 1, wherein at the aforementioned step (d) (i), a table relating the management number of the vector, the mesh size appropriate to said vector and the position of the mesh traversed by said vector to one another is prepared in said storage unit, and said graphic processor manages said drawing data with the aid of said table.

6. A drawing information managing method according to claim 1, wherein at the aforementioned step (d) (ii) where said domain is equally divided into said different number of meshes, when the mesh size resulting from this division exceeds a predetermined size, position data of a rectangle circumscribing said vector is stored in said storage unit as the drawing data of said vector, and a next vector constituting a part of said drawing data is selected to undergo the processing in the aforementioned steps (b), (c) and (d).

7. A method of managing drawing information in a drawing information management system including a graphic processor and a storage unit, comprising steps of:
    (a) determining a domain covering a whole drawing data to be subjected to the graphic processing, said drawing data including a closed region;
    (b) dividing said domain into a first number of meshes of a same size;
    (c) determining the number of those meshes which bear overlap relation to said closed region of said drawing data; and
    (d) comparing said number of the meshes with a predetermined value, wherein
        (i) when said number of the meshes is not greater than a predetermined value, the mesh size and positions of all the meshes lying in overlap relation with said closed region are stored in said storage unit as the drawing data; while
        (ii) when said number of the meshes exceeds said predetermined value, said domain is equally divided into a number of meshes which number differs from said first number of meshes, being followed by execution of the aforementioned steps (c) and (d).

8. A drawing information managing method according to claim 7, wherein said drawing data is a circumscribed rectangle circumscribing a text/symbol string.

9. A drawing information managing method according to claim 7, wherein at the aforementioned step (d) (ii), said domain is equally divided into the meshes of a mesh size greater than the preceding one.

10. A drawing information managing method according to claim 7, wherein at the aforementioned step (b), said domain is equally divided into the meshes of such a size in which the greatest number of vectors of those constituting said drawing data can be included by the individual meshes.

11. A drawing information managing method according to claim 7, wherein at the aforementioned steps (b) and (d) (ii), said domain is equally divided by a factor of $2^{2n}$ (where n is a given one selected from 0, 1, 2, 3, ...).

12. A drawing information managing method according to claim 7, wherein at the aforementioned (d) (i), a table relating a management number of said drawing data, the mesh size appropriate to said drawing data and positions of the meshes covered by the closed region of said drawing data to one another is prepared in said storage unit, and said graphic processor manages the drawing data with the aid of said table.

13. A drawing information managing method according to claim 12, wherein the positions of said meshes are arrayed in a predetermined sequence in said table.

14. A system for managing drawing information, comprising:
    display means for displaying visually drawing information for graphic processing;
    coordinate input means for designating positions on said display means;
    storage unit for storing said drawing information; and
    a processor coupled to said display means and said storage unit for processing said drawing information;
    said processor executing the following steps:

(a) determining a domain which covers a whole drawing data to be subjected to the information processing;
(b) dividing said domain into a first number of meshes of a same size;
(c) determining the number of the meshes traversed by a vector constituting a part of said drawing data; and
(d) comparing said number of the meshes with a predetermined value, wherein
  (i) when said number of the meshes is not greater than a predetermined value, the current mesh size and the positions of the meshes traversed by said vector are stored in said storage unit as drawing information of said vector, and a next vector constituting another part of said drawing data is selected to undergo the processing in the aforementioned steps (b), (c) and (d), while
  (ii) when said number of the meshes exceeds said predetermined value, said domain is divided into a second number of meshes of a same size, which number differs from said first number, being then followed by execution of said steps (c) and (d), and
  (iii) when the drawing information have been determined for all the vector constituting said drawing data, storage of said drawing information into said storage unit is completed.

15. A system for managing schematic information, comprising first memory means for storing schematic information including constituents such as picture, text, symbol or the like; and second memory means for storing indexes for allowing said constituents to be retrieved at a high speed, said indexes being prepared by deciding ranges appropriate to sizes of said constituents and arrayed hierarchically on the basis of the result of said decision, wherein a plurality of different managements are performed with the aid of said indexes stored in said second storage means, said indexes being classified into two hierarchies of high and low levels, respectively, wherein the indexes of low hierarchical level are prepared by dividing a whole schematic into virtual small areas referred to as meshes, determining the mesh identification numbers of the meshes traversed by said constituent, dividing again said whole schematic in such a sense that the size of the mesh is increased until predetermined conditions for the number of the meshes traversed by one constituent are satisfied to thereby allow the appropriate mesh data including the mesh size and the mesh identification number of the mesh traversed by said constituent to be stored only when said predetermined conditions are satisfied, while said indexes of said high level hierarchy designated the storage of circumscribed rectangular regions corresponding to the individual constituents, respectively.

* * * * *